US012660856B2

(12) United States Patent
Zhou et al.

(10) Patent No.: US 12,660,856 B2
(45) Date of Patent: Jun. 23, 2026

(54) TUBULAR HEATING BODY AND AEROSOL-GENERATING APPARATUS

(71) Applicant: SHENZHEN SMOORE TECHNOLOGY LIMITED, Shenzhen (CN)

(72) Inventors: Hongming Zhou, Shenzhen (CN); Huanxi Li, Shenzhen (CN); Hong Li, Shenzhen (CN); Rihong Li, Shenzhen (CN); Xianwu Du, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 427 days.

(21) Appl. No.: 18/363,111

(22) Filed: Aug. 1, 2023

(65) Prior Publication Data

US 2024/0016214 A1 Jan. 18, 2024

Related U.S. Application Data

(63) Continuation of application No. PCT/CN2021/133701, filed on Nov. 26, 2021.

(30) Foreign Application Priority Data

Feb. 2, 2021 (CN) ........................ 202120298672.0

(51) Int. Cl.

| | |
|---|---|
| *A24F 40/46* | (2020.01) |
| *A24F 40/20* | (2020.01) |
| *A24F 40/70* | (2020.01) |
| *H05B 3/46* | (2006.01) |

(52) U.S. Cl.

CPC .............. *A24F 40/46* (2020.01); *A24F 40/20* (2020.01); *A24F 40/70* (2020.01); *H05B 3/46* (2013.01); *H05B 2203/021* (2013.01); *H05B 2203/022* (2013.01); *H05B 2203/032* (2013.01)

(58) Field of Classification Search

CPC .......... A24F 40/46; A24F 40/40; A24F 40/20; A24F 40/70; A24F 47/00; H05B 3/46

See application file for complete search history.

(56) References Cited

U.S. PATENT DOCUMENTS

2016/0255879 A1* 9/2016 Paprocki ................ A24F 40/46

FOREIGN PATENT DOCUMENTS

| | | |
|---|---|---|
| CN | 104770895 B | 8/2017 |
| CN | 110101124 A | 8/2019 |
| CN | 110313639 A | 10/2019 |

(Continued)

OTHER PUBLICATIONS

Patent Cooperation Treaty, International Search Report and Written Opinion, International Application No. PCT/CN2021/133701 (Feb. 18, 2022).

(Continued)

*Primary Examiner* — Elizabeth L Mckane

(74) *Attorney, Agent, or Firm* — Leydig, Voit & Mayer, Ltd.

(57) ABSTRACT

A tubular heating body includes: a heating main body. The heating main body is formed by splicing at least two heating units. In an embodiment, each heating unit of the at least two heating units includes: a substrate tube; an electric heating layer disposed on the substrate tube; and an infrared radiation layer disposed on the substrate tube.

18 Claims, 9 Drawing Sheets

(56) References Cited

FOREIGN PATENT DOCUMENTS

| | | | | | |
|---|---|---|---|---|---|
| CN | 211910516 | U | | 11/2020 | |
| CN | 211910554 | U | * | 11/2020 | ............. A24F 40/40 |
| CN | 112205682 | A | | 1/2021 | |
| CN | 216019092 | U | | 3/2022 | |
| KR | 20190010214 | A | * | 1/2019 | ........... A24F 47/008 |
| WO | 2016123738 | A1 | | 8/2016 | |
| WO | WO-2016179828 | A1 | * | 11/2016 | ............. A24F 40/05 |
| WO | 2021001267 | A1 | | 1/2021 | |
| WO | 2021008531 | A1 | | 1/2021 | |

OTHER PUBLICATIONS

European Patent Office, Search Report in European Patent Application No. 21924331.8 (Jul. 10, 2024).

* cited by examiner

TUBULAR HEATING BODY AND AEROSOL-GENERATING APPARATUS

CROSS-REFERENCE TO PRIOR APPLICATION

This application is a continuation of International Patent Application No. PCT/CN2021/133701, filed on Nov. 26, 2021, which claims priority to Chinese Patent Application No. 202120298672.0, filed on Feb. 2, 2021. The entire disclosure of both applications is hereby incorporated by reference herein.

FIELD

The present invention relates to the field of vaporization, and more specifically, to a tubular heating body and an aerosol-generating apparatus.

BACKGROUND

A heat-not-burn vaporization apparatus is an aerosol-generating apparatus that heats a vaporization material in a low temperature heat-not-burn manner to form an inhalable aerosol.

Currently, heating manners of the heat-not-burn vaporization apparatus mainly include resistive heating, electromagnetic heating, and infrared heating. Heating structures of the heat-not-burn vaporization apparatus mainly include center piece heating, center pin heating, and tube heating. The center piece heating and the center pin heating have advantages of fast heating speed of the vaporization material, but have disadvantages of low utilization rate of the vaporization material and low consistency of mouthfeel. Tube heating has the disadvantages of slow heating speed and low energy utilization, but has the advantages of high utilization of the vaporization material and good consistency of mouthfeel.

At present, the basic reasons for the disadvantages of slow heating speed and low energy utilization of tube heating are as follows: Due to the limitation of a forming process, a heating circuit of a resistance tube type is usually arranged outside the tube, and the heat insulation treatment process is complex. Thus, a part of energy radiates to the outside of the tube.

The outer wall of an electromagnetic tube type cannot be directly subjected to heat insulation processing, but heat insulation processing can only be performed on the outer side of a coil, which easily causes excessive coil temperature and affects the stability of a heating body. In addition, there is a specific distance between the inner wall of the tube and the vaporization material. Because the heat conductivity coefficient of the air is low, the heat resistance between the inner wall of the tube and the outer wall of the vaporization material is large, which causes a low heating rate of the vaporization material.

SUMMARY

In an embodiment, the present invention provides a tubular heating body, comprising: a heating main body, wherein the heating main body is formed by splicing at least two heating units.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
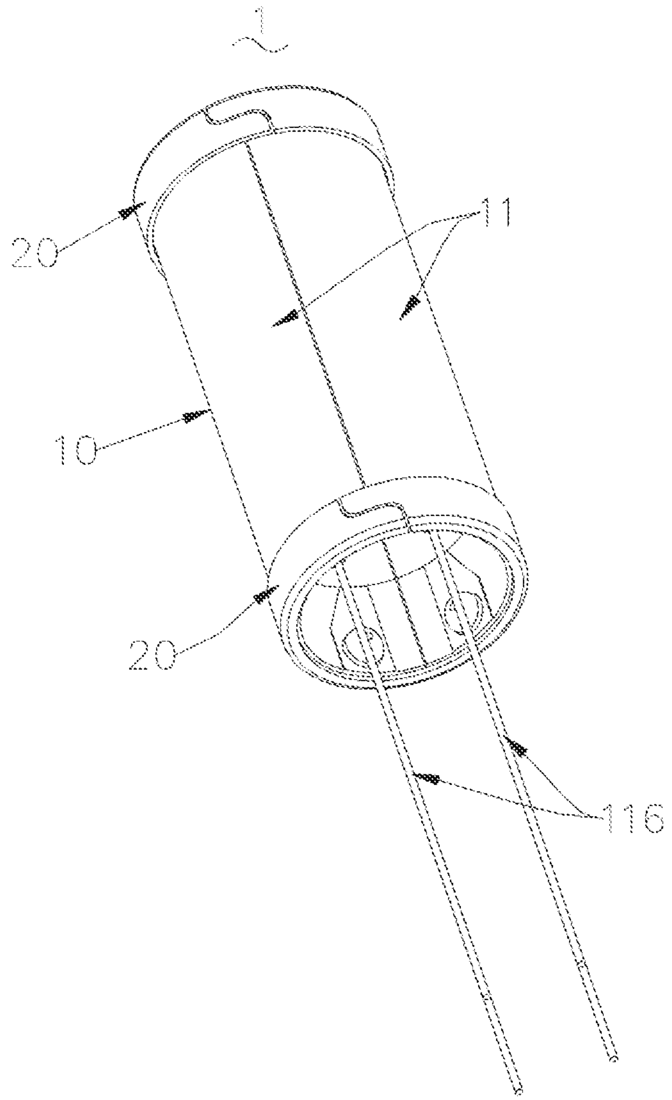
FIG. 1 is a schematic diagram of a three-dimensional structure of a tubular heating body according to a first embodiment of the present invention.
Figure 2:
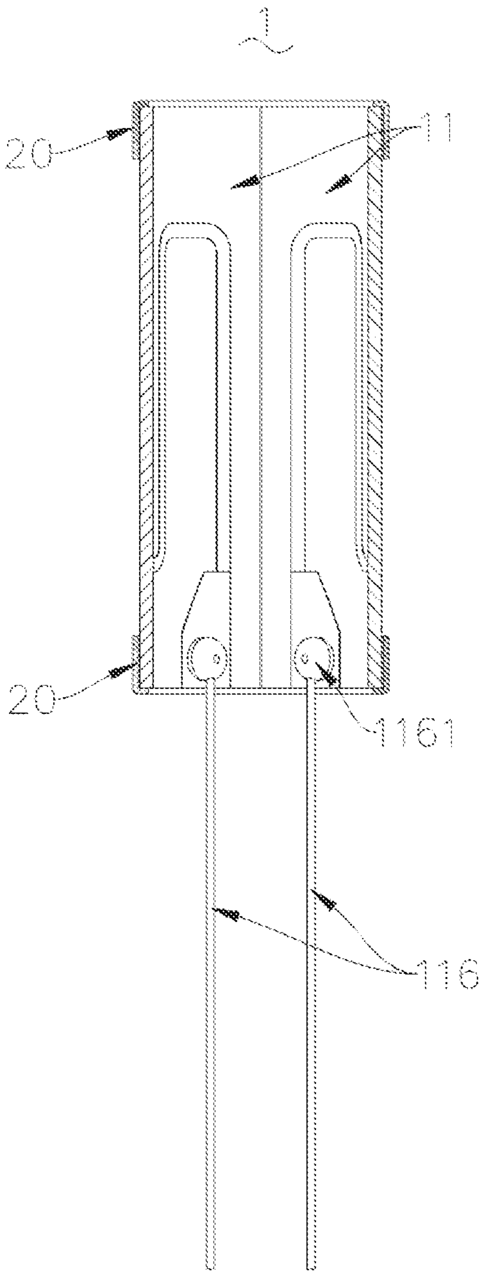
FIG. 2 is a schematic diagram of a sectional structure of the tubular heating body shown in FIG. 1.
Figure 3:
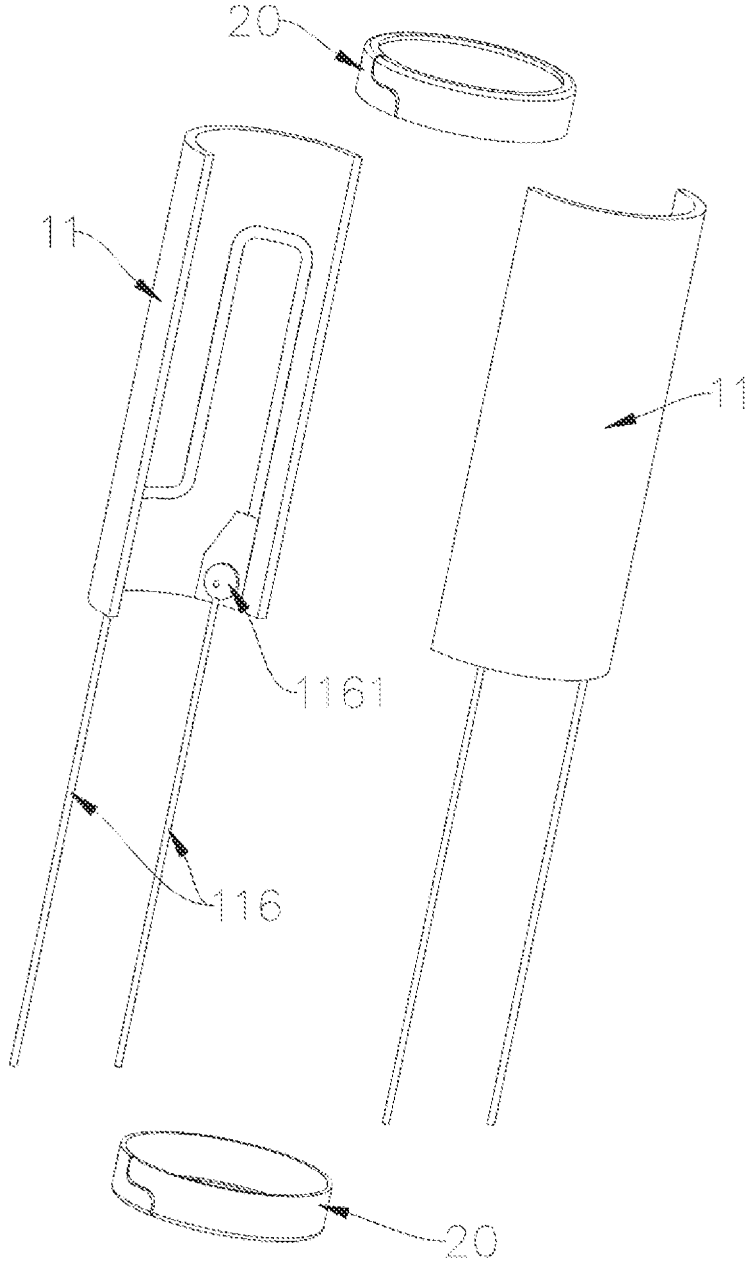
FIG. 3 is a schematic diagram of an exploded structure of the tubular heating body shown in FIG. 1.
Figure 4:
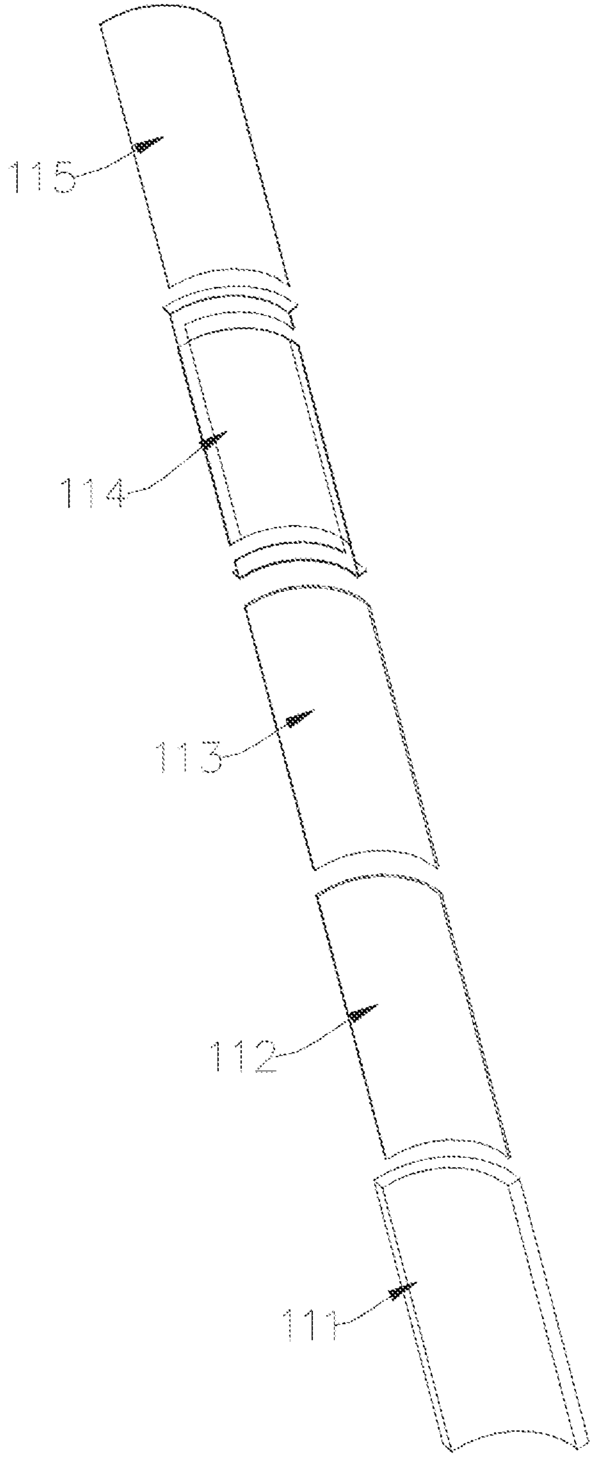
FIG. 4 is a schematic diagram of an exploded structure of a heating unit in FIG. 3.

In an embodiment, the present invention provides an improved tubular heating body and an aerosol-generating apparatus having the tubular heating body.

In an embodiment, the present invention provides a tubular heating body, including a heating main body, where the heating main body is formed by splicing at least two heating units.

In some embodiments, each heating unit includes a substrate tube, an electric heating layer disposed on the substrate tube, and an infrared radiation layer disposed on the substrate tube.

In some embodiments, each heating unit further includes a reflective layer and an insulating layer; and the reflective layer, the insulating layer, the electric heating layer, and the infrared radiation layer are sequentially disposed inside the substrate tube.

In some embodiments, the heating main body is formed by splicing at least two heating units in the circumferential direction.

In some embodiments, the tubular heating body further includes at least one annular hoop sleeved outside the heating main body.

In some embodiments, there are two annular hoops respectively sleeved on two ends of the heating main body.

In some embodiments, the tubular heating body further includes two electrode leads electrically connected to the electric heating layer.

In some embodiments, the two electrode leads are led out from the inner wall surface of the heating main body.

In some embodiments, the two electrode leads are led out from one end surface or two end surfaces of the heating main body.

In some embodiments, fillets are formed on inner circles at two ends of the heating unit.

In some embodiments, the heating main body is formed by splicing at least two heating units in the axial direction.

In some embodiments, the tubular heating body further includes two electrode plates electrically connected to the electric heating layer, and the two electrode plates are respectively disposed outside the two ends of the heating main body.

In some embodiments, the tubular heating body further includes a conductive heat insulating tube disposed between the heating main body and the electrode plate, and conducting the electric heating layer and the electrode plate.

In some embodiments, the tubular heating body further includes a heat insulating sleeve sleeved outside the heating main body.

In some embodiments, the tubular heating body further includes a reflective layer, where the reflective layer is disposed on the inner wall surface or the outer wall surface of the substrate tube, or the reflective layer is disposed on the inner wall surface of the heat insulating sleeve.

In some embodiments, the electric heating layer is disposed on the inner wall surface and two end surfaces of the substrate tube, and the infrared radiation layer is disposed on the inner side of the substrate tube.

In some embodiments, fillets are formed on inner circles at two ends of the heating unit.

In some embodiments, the axial length of the substrate tube is 4-6 mm.

In some embodiments, the electric heating layer and the infrared radiation layer are separately deposited on the inner side of the substrate tube through PVD (Physical Vapor Deposition).

The present invention further provides an aerosol-generating apparatus, including the tubular heating body according to any one of the foregoing.

Beneficial Effects

Implementation of the present invention has at least the following beneficial effects: A heating main body is formed by splicing at least two heating units; and

- the structure configuration can implement that an electric heating layer and an infrared radiation layer of the heating unit are disposed on the inner surface of a substrate tube, thereby shortening the heating conduction distance and the radiation distance between the infrared radiation layer and an aerosol-generating substrate, and improving heating efficiency and heating uniformity.

To have a clearer understanding of the technical features, objectives, and effects of the present invention, specific implementations of the present invention are described in detail with reference to the accompanying drawings.

As shown in FIGS. 1-4, a tubular heating body 1 in a first embodiment of the present invention may include a heating main body 10 and at least one annular hoop 20 sleeved outside the heating main body 10.

The heating main body 10 may be a circular tubular body, and may be formed by splicing two semi-circular tubular heating units 11 in the circumferential direction. After the two heating units 11 are spliced into a circular tube in the circumferential direction, the tube is fixed by using the annular hoop 20. In another embodiment, the heating main body 10 may alternatively have another shape such as an oval tubular shape, a square tubular shape, or a polygonal tubular shape. The heating main body 10 may alternatively be formed by splicing two or more heating units 11 in the circumferential direction.

Each heating unit 11 includes a substrate tube 111 and a composite film disposed on the substrate tube 111. In some embodiments, the composite film may be a physical vapor deposition composite film (PVD composite film) deposited on the inner wall surface of the substrate tube 111, and may include a reflective layer 112 disposed inside the substrate tube 111, an insulating layer 113 disposed inside the reflective layer 112, an electric heating layer 114 disposed inside the insulating layer 113, and an infrared radiation layer 115 disposed inside the electric heating layer 114.

The electric heating layer 114 and the infrared radiation layer 115 are disposed inside the substrate tube 111, so that the radiation heating ratio can be greatly increased, and heating efficiency of the heating body can be improved. In addition, the inner wall heating mode can also reduce the temperature of the outer wall of the heating body and simplify heat insulation parts.

The substrate tube 111 may be molded by injection or extrusion, so that production efficiency is high. The substrate tube 111 may be made of a porous high-thermal-resistance ceramic such as porous diatomaceous earth, or high-temperature-resistant glass, and has functions of heat insulation and insulating.

The thickness of the substrate tube 111 may be between 0.6-3 mm, and the cross section of the substrate tube 111 is a semi-circular arc shape, and the cross section shape is convenient for extrusion molding.

The reflective layer 112 may be deposited on the inner wall surface of the substrate tube 111 by means of pad printing or PVD, and may be made of, for example, a $SnO_2$-based, $In_2O_3$-based, ZnO-based, Ag-based, Al-based metal oxide slurry or powder, or a composite doping material thereof having a high reflectance.

The thickness of the reflective layer 112 may be between 5-200 μm and preferably 5-30 μm.

The insulating layer 113 may be deposited on the reflective layer 112 through screen printing or PVD, and may be made of a non-conductive slurry or powder such as $ZrO_2$, $SiO_2$, or $Al_2O_3$.

The thickness of the insulating layer 113 may be 5-40 μm, preferably 5-20 μm. The insulating layer 113 is disposed between the reflective layer 112 and the electric heating layer 114, so as to insulate the reflective layer 112 from the electric heating layer 114.

The electric heating layer 114 may be deposited on the insulating layer 113 through screen printing or PVD, and the thickness of the electric heating layer 114 may be 5-100 μm, preferably 5-50 μm.

The electric heating layer 114 may include a conductive line 1141 and a heating film 1142. The conductive line 1141 is mainly configured to form an appropriate conductive trace pattern to allocate a heating area according to a requirement.

The heating film 1142 is mainly configured to heat up after power-on. The conductive line 1141 and the heating film 1142 may be made of different materials. The conductive line 1141 may be made of a material with a relatively small resistivity and less heat, and the heating film 1142 may be made of a material with a relatively large resistivity.

The infrared radiation layer 115 may be deposited on the electric heating layer 114 through screen printing or PVD, and may be made of at least one of $Fe_2O_3$, $MnO_2$, $Co_2O_3$, $ZrO_2$, $SiO_2$, SiC, $TiO_2$, $Al_2O_3$, $CeO_2$, $La_2O_3$, MgO, TiC, CrC, TiCN, cordierite, and perovskite.

The thickness of the infrared radiation layer 115 may be 5-200 μm, preferably 5-50 μm.

There may be two annular hoops 20, and the two annular hoops 20 are respectively sleeved outside two axial ends of the heating main body 10. The annular hoop 20 may be made of a material such as porous high-thermal-resistance ceramic such as porous diatomaceous earth or high-temperature-resistant glass, and may be integrally sintered with the heating main body 10.

The sintering temperature may be between 600-1600 degrees Celsius.

In some embodiments, each heating unit 11 may further include two electrode leads 116 electrically connected to the electric heating layer 114, and configured to be electrically connected to a positive electrode and a negative electrode of a battery.

The two electrode leads 116 may be led out from the inner wall surface of the heating unit 11, and conductive pads 1161 of the electrode leads 116 may be deposited on the inner wall surface of the heating unit 11 and directly welded.

Figure 5:
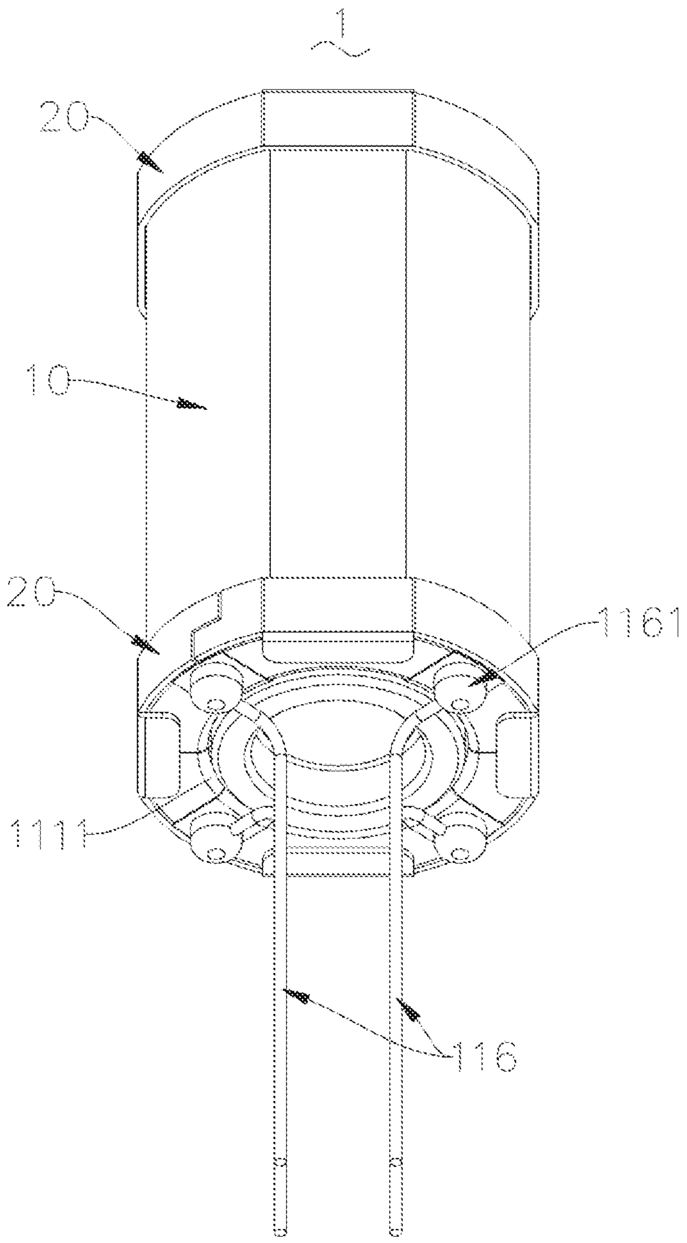
FIG. 5 is a schematic diagram of a three-dimensional structure of a tubular heating body according to a second embodiment of the present invention.
Figure 6:
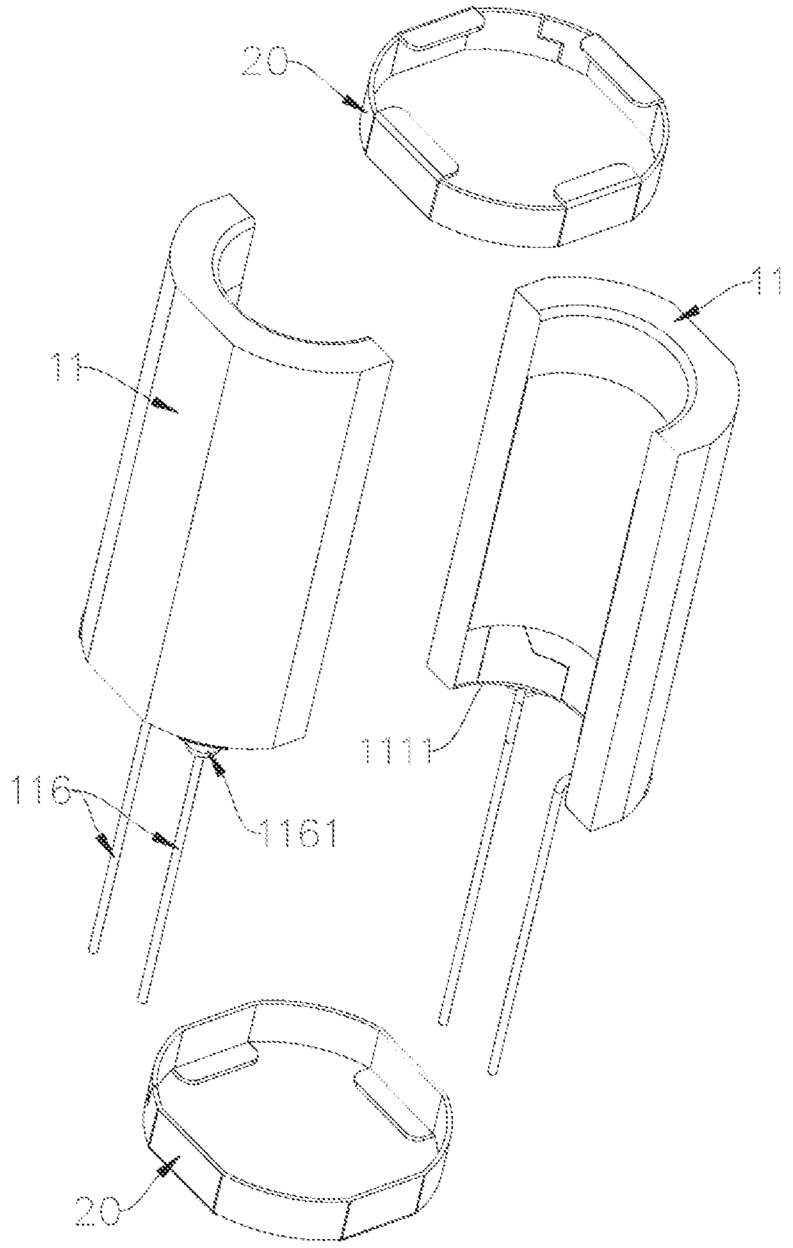
FIG. 6 is a schematic diagram of an exploded structure of the tubular heating body shown in FIG. 5.

FIGS. 5-6 show a tubular heating body 1 in a second embodiment of the present invention. Compared with the first embodiment, the two electrode leads 116 of the heating unit 11 in this embodiment may be led out from one end surface of the heating unit 11. It may be understood that in other embodiments, alternatively, the two electrode leads 116 may be respectively led out from two end surfaces of the heating unit 11.

The conductive pad 1161 of the electrode lead 116 may be deposited on the end surface of the heating unit 11 and directly welded. Fillets 1111 are formed on the inner circles at two ends of the heating unit 11. Fillet transition can ensure uniform deposition thickness, and ensure reliable connection of an end surface weld. The electric heating layer 114 must be continuously deposited on the end surface of the heating unit 11 to ensure reliable end surface wire bonding. The thickness of the substrate tube 111 should be able to put down the pad, and the thickness should not be less than 1.5 mm.

Figure 7:
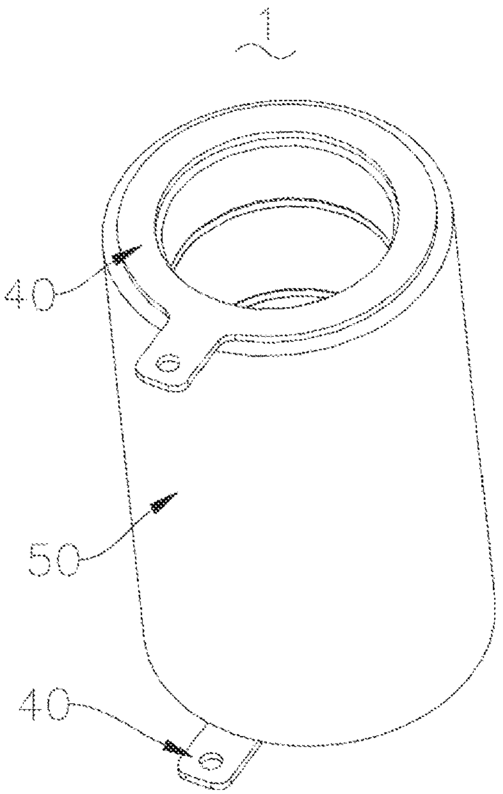
FIG. 7 is a schematic diagram of a three-dimensional structure of a tubular heating body according to a third embodiment of the present invention.
Figure 8:
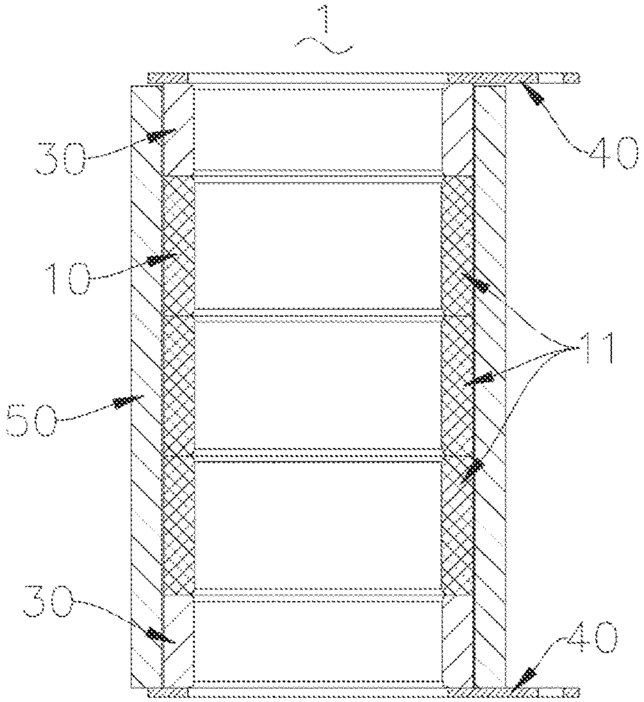
FIG. 8 is a schematic diagram of a sectional structure of the tubular heating body shown in FIG. 7.
Figure 9:
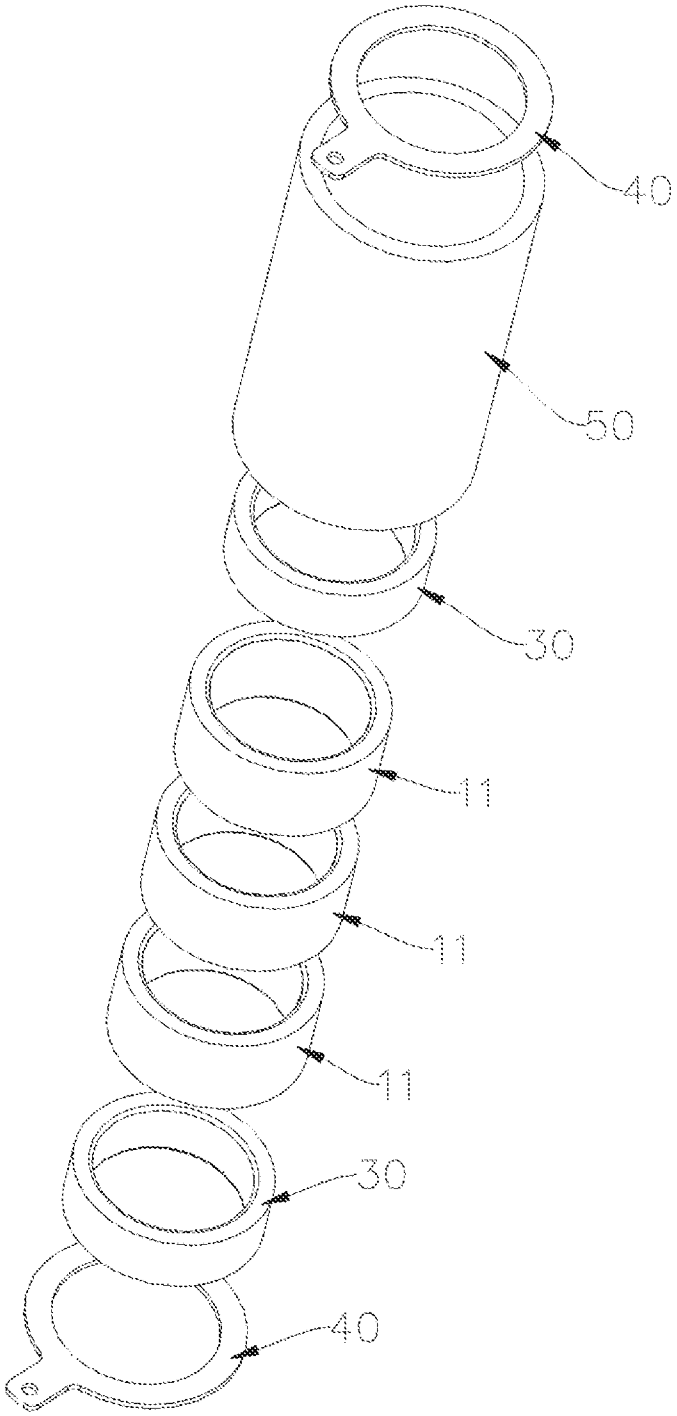
FIG. 9 is a schematic diagram of an exploded structure of the tubular heating body shown in FIG. 7.

FIGS. 7-9 show a tubular heating body 1 in a third embodiment of the present invention. The tubular heating body 1 may include a heating main body 10, two conductive heat insulating tubes 30 respectively disposed at two axial ends of the heating main body 10, a heat insulating sleeve 50 sleeved outside the heating main body 10 and the two conductive heat insulating tubes and two electrode plates 40 respectively disposed at two ends of the two conductive heat insulating tubes 30.

The heating main body 10 may be in a cylindrical shape, and may be formed by splicing at least two (three in this embodiment) short cylindrical heating units 11 along the axial direction.

The heating unit 11 has a low aspect ratio, and an excessively long length of the heating unit 11 is unfavorable for controlling uniformity of PVD deposition thickness. If the length of the heating unit 11 is excessively short, the quantity of assembly sections increases, which is unfavorable for production. In some embodiments, the axial length of the heating unit 11 may be between 4-6 mm, so that a reflective layer, an insulating layer, an electric heating layer, and an infrared radiation layer are successively deposited on the inner wall surface of the substrate tube 111 by means of PVD. In another embodiment, alternatively, the reflective layer may be plated on the outer wall surface of the substrate tube 111, or may be disposed on the inner wall surface of the heat insulating sleeve 50.

In this embodiment, the heating unit 11 and the conductive heat insulating tube 30 are separately manufactured, the manufacturing process of a single short tube is relatively simplified, and an internal heating part and conductive part may be manufactured into an integral thin film.

The end surface of the heating unit 11 needs to be polished and flattened, and fillets are formed on the inner circles at two ends of the heating unit 11. The electric heating layer must be continuously deposited on two end surfaces of the heating unit 11, and two adjacent heating units 11 are connected in series by using the electric heating layer on the two end surfaces.

The conductive heat insulating tube 30 is disposed at two ends of the heating main body and is configured to conduct the heating unit 11 and the electrode plate 40 and perform heat insulation.

The conductive heat insulating tube 30 may include a main substrate and a conductive layer disposed on the main substrate. The main substrate may be made of a porous high-thermal-resistance ceramic such as porous diatomaceous earth, high-temperature-resistant glass, or the like. The conductive layer may be deposited on the inner wall surface and two end surfaces of the main substrate through PVD, and is configured to connect the electric heating layer of the heating main body 10 and the electrode plate 40 in series. The conductive heat insulating tube 30 has a relatively low aspect ratio, so that a conductive layer is deposited on the inner wall surface of the main substrate through PVD. The heat insulating sleeve 50 is disposed outside the heating main body and the two conductive heat insulating tubes 30, and has a heat insulating function. The heat insulating sleeve 50 may be made of a material such as a porous high-thermal-resistance ceramic such as porous diatomaceous earth or high-temperature-resistant glass.

Figure 10:
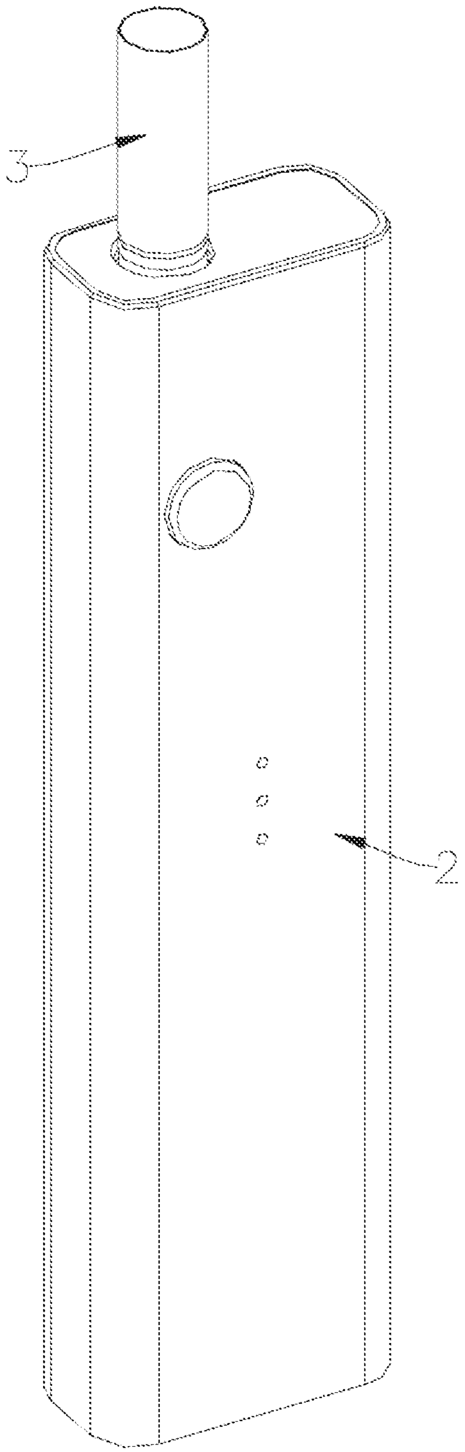
FIG. 10 is a schematic diagram of a three-dimensional structure of an aerosol-generating apparatus according to some embodiments of the present invention.

As shown in FIG. 10, the present invention further provides an aerosol-generating apparatus. The aerosol-generating apparatus may be substantially in a square column shape and includes a housing 2, a tubular heating body 1 disposed in the housing 2, and a battery disposed in the housing 2 and electrically connected to the tubular heating body 1.

An aerosol-generating substrate 3 may be inserted into the housing 2 from the top of the housing 2 and protrude into the tubular heating body 1. After being energized and heated, the tubular heating body 1 bakes and heats the aerosol-generating substrate 3 to form an aerosol for a user to inhale. In some embodiments, the aerosol-generating substrate 3 may be a cigarette. It may be understood that the aerosol-generating apparatus is not limited to being in a square columnar shape, or may be in another shape such as a columnar shape.

The tubular heating body 1 in the present invention has at least the following advantages:

1. The tubular heating body 1 is integrally formed in a sintering manner and has a simple structure and high reliability.
2. The electric heating layer 114 and the infrared radiation layer 115 are disposed on the inner surface of the substrate tube 111. The electric heating layer 114 directly contacts the infrared radiation layer 115 to excite radiation, so as to greatly increase the radiation-to-heat ratio, shorten the heating conduction distance and the radiation distance between the electric heating layer 114, the infrared radiation layer 115, and the aerosol-generating substrate 3, improve heating efficiency and energy utilization, and reduce the internal temperature rise of the entire apparatus.
3. The reflective layer 112 is disposed in the substrate tube 111, and radiation is directly reflected in the substrate tube 111, so as to reduce radiation escaping to the outside of the tubular heating body 1, and reduce the surface temperature of the tubular heating body 1, which helps improve overall performance and use experience of the aerosol-generating apparatus, reduce the radiation divergence range, and improve energy utilization.

4. The composite film of the tubular heating body 1 uses a PVD deposition process, and a technology is mature, so as to facilitate industrial automation production.

It may be understood that the foregoing technical features may be used in any combination without any limitation.

The foregoing embodiments only describe preferred implementations of the present invention specifically and in detail, but cannot be construed as a limitation to the patent scope of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A tubular heating body, comprising:

a heating main body, wherein the heating main body is formed by splicing at least two heating units in an axial direction, and wherein each heating unit of the at least two heating units comprises:

a substrate tube;

an electric heating layer disposed on the substrate tube; and an infrared radiation layer disposed on the substrate tube; and wherein the electric heating layer is disposed on an inner wall surface and two end surfaces of the substrate tube, and wherein the infrared radiation layer is disposed on an inner side of the substrate tube.

2. The tubular heating body of claim 1, wherein each heating unit further comprises:

a reflective layer; and an insulating layer, wherein the reflective layer, the insulating layer, the electric heating layer, and the infrared radiation layer are sequentially disposed inside the substrate tube.

3. The tubular heating body of claim 1, further comprising:

two electrode plates electrically connected to the electric heating layer, and wherein the two electrode plates are respectively disposed outside two ends of the heating main body.

4. The tubular heating body of claim 3, further comprising:

a conductive heat insulating tube disposed between the heating main body and the electrode plate, and wherein a conductive layer of the conductive heat insulating tube is configured to conduct the electric heating layer and the electrode plate.

5. The tubular heating body of claim 1, further comprising:

a heat insulating sleeve sleeved outside the heating main body.

6. The tubular heating body of claim 5, further comprising:

a reflective layer disposed on an inner wall surface or an outer wall surface of the substrate tube, or disposed on an inner wall surface of the heat insulating sleeve.

7. The tubular heating body of claim 1, wherein fillets are formed on inner circles at two ends of the at least two heating units.

8. The tubular heating body of claim 1, wherein an axial length of the substrate tube is 4-6 mm.

9. The tubular heating body of claim 1, wherein the electric heating layer and the infrared radiation layer are separately deposited on an inner side of the substrate tube through PVD.

10. An aerosol-generating apparatus, comprising:

the tubular heating body of claim 1.

11. A tubular heating body, comprising:

a heating main body, wherein the heating main body is formed by splicing at least two heating units in an axial direction, and wherein each heating unit of the at least two heating units comprises:

a substrate tube;

an electric heating layer disposed on the substrate tube; and an infrared radiation layer disposed on the substrate tube;

two electrode plates electrically connected to the electric heating layer, wherein the two electrode plates are respectively disposed outside two ends of the heating main body; and a conductive heat insulating tube disposed between the heating main body and the electrode plate, wherein a conductive layer of the conductive heat insulating tube is configured to conduct the electric heating layer and the electrode plate.

12. The tubular heating body of claim 11, wherein each heating unit further comprises:

a reflective layer; and an insulating layer, wherein the reflective layer, the insulating layer, the electric heating layer, and the infrared radiation layer are sequentially disposed inside the substrate tube.

13. The tubular heating body of claim 11, further comprising:

a heat insulating sleeve sleeved outside the heating main body.

14. The tubular heating body of claim 13, further comprising:

a reflective layer disposed on an inner wall surface or an outer wall surface of the substrate tube, or disposed on an inner wall surface of the heat insulating sleeve.

15. The tubular heating body of claim 11, wherein fillets are formed on inner circles at two ends of the at least two heating units.

16. The tubular heating body of claim 11, wherein an axial length of the substrate tube is 4-6 mm.

17. The tubular heating body of claim 11, wherein the electric heating layer and the infrared radiation layer are separately deposited on an inner side of the substrate tube through PVD.

18. An aerosol-generating apparatus, comprising:

the tubular heating body of claim 11.

* * * * *